UNITED STATES PATENT OFFICE.

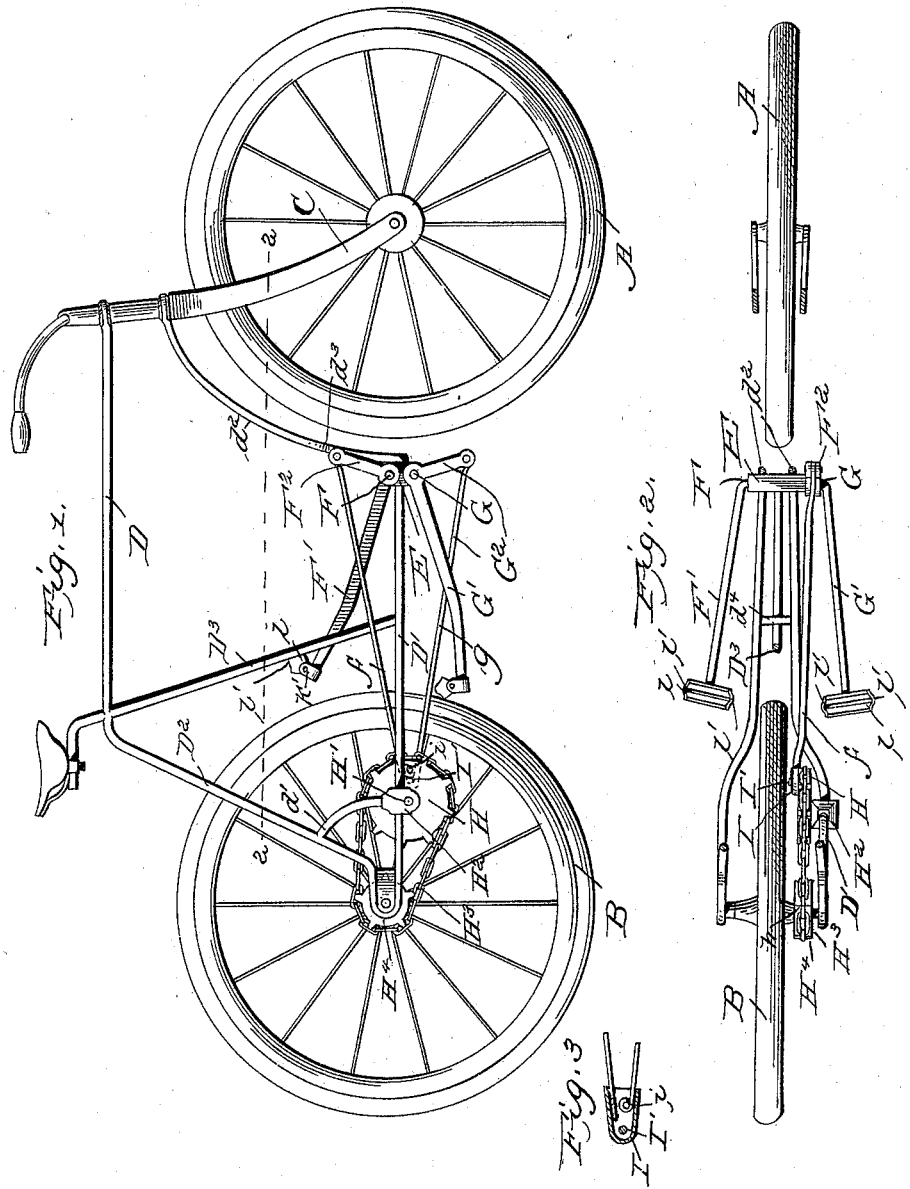

HERCULES CAVICCHI, OF PLATTSBURG, NEW YORK.

PROPELLING MEANS FOR BICYCLES OR SIMILAR VEHICLES.

SPECIFICATION forming part of Letters Patent No. 605,392, dated June 7, 1898.

Application filed March 31, 1897. Serial No. 630,121. (No model.)

*To all whom it may concern:*

Be it known that I, HERCULES CAVICCHI, a citizen of the United States, residing at Plattsburg, in the county of Clinton and State of New York, have invented certain new and useful Improvements in Propelling Means for Bicycles or Similar Vehicles, of which the following is a specification.

My invention relates to improvements in propelling means for bicycles and similar vehicles; and the object of the invention is to provide an extremely simple and effective form of driving or propelling means by means of which a high degree of speed may be obtained.

The invention is illustrated in the accompanying drawings, in which—

Figure 1 is a side elevation of a bicycle, showing my improved propelling mechanism applied thereto; and Fig. 2 is a plan view, parts of the bicycle being omitted in this figure. Fig. 3 is a detail.

The bicycle shown in the drawings may be of the ordinary or any desired construction, except in certain parts where I have found it desirable to provide a particular construction the better to adapt the bicycle to receive my improved driving or propelling mechanism.

In the drawings, A represents the front or steering wheel; B, the rear or driving wheel; C, the front forks, and D the main frame. This main frame carries a double shaft casing or box E, in which are journaled two rock or treadle shafts F and G, carrying treadle-levers $F'$ and $G'$, respectively, located on opposite sides of the bicycle, to which power is applied by the feet of the rider to propel the bicycle. The rock-shafts F and G also carry arms $F^2$ and $G^2$, both of which are preferably located upon the same side of the bicycle, one of which, $F^2$, extends upwardly, while the other, $G^2$, extends downwardly. The extremities of these arms $F^2$ $G^2$ are connected by pitmen $f$ and $g$ with a wheel H, which is adapted by suitable gearing to drive the rear wheel of the bicycle when pressure is applied upon the treadles. As the arms $F^2$ and $G^2$ extend in opposite directions and both arms are connected by the pitmen to the wheel H, it will be seen that the treadle-levers are caused to move alternately, so that when pressure is applied to one to force it downwardly the other will be simultaneously raised, and vice versa.

I prefer to connect the rear ends of the pitmen to the wheel H in the manner shown in the drawings, in which a box or plate I is connected to the face of the wheel H by a journal-pin $I'$, and the rear end of one of the pitmen is pivotally connected to the box by a suitable pivot-pin $i$ and the other end of the outer pitman is brazed therein.

The rear forks $D'$ of the bicycle-frame are curved outwardly, as shown at $d$, to provide a space for the wheel H, which is carried on a shaft $H'$, journaled in a boxing $H^2$, secured on fork $D'$. This boxing and the fork are preferably strengthened and braced by a brace-rod $d'$, running from the rear brace-arm $D^2$ of the frame to the fork $D'$. The wheel H may be caused to transmit its motion to the rear wheel in any suitable manner, but preferably by the arrangement shown in the drawings. In this form the motion is transmitted by a chain $H^3$ running over the wheel H and over a corresponding sprocket-wheel $H^4$ on the hub of the rear or driving wheel. The chain is composed of a series of plain interlocking links, and the sprocket-wheels H and $H^4$ are each formed with a central channel $h$ and two rows of teeth $h'$, the space between the teeth of each row being adapted to permit one link to lie flat while the next link is held vertically between the teeth.

In order to give strength to the frame, I prefer to construct the lower portion, including the rear forks, of two tubes or bars $d^2$, which extend from the steering-head downward to the bearing-box, diverging at $d^3$ and passing through the box between the two shafts.

From the bearing-box the tubes or bars extend rearwardly, forming the forks $D'$, before referred to. The saddle-post rod $D^3$ is extended through a cross-box $d^4$, connecting the forks $D'$, and is carried forward between the forks $D'$ to the box, to which it is suitably connected, this construction providing an exceedingly stiff strong frame.

The ends of the treadle-levers are provided with cross-bars having upwardly-turned ends or ears $k'$, and between these ears are pivoted the rocking pedals $l$, which are formed of channel or U-shaped bars having ears $l'$ extending up at each end to retain the feet against displacement sidewise.

Having thus described my invention, what I claim is—

1. In a bicycle or similar vehicle, a pair of rock-arms journaled in the frame, treadle-levers carried by said shafts upon opposite sides of the frame, arms carried by said shafts upon one side and extending in opposite directions, a wheel journaled in the frame, pitmen having their forward ends connected to the extremities of the arms and their rear ends connected to the said wheel by a common pivot, and driving connections from the said wheel to the rear wheel of the bicycle, substantially as described.

2. In a bicycle or similar vehicle, a pair of rock-shafts journaled in the frame, one above the other, treadles carried by said shafts upon opposite sides of the frame, an arm carried by the upper shaft extending upwardly and a similar arm carried by the lower one extending downwardly, a sprocket-wheel journaled in the frame, a pitman extending from the extremity of each arm to the said wheel, a sprocket-wheel connected to the hub of the driving-wheel, and a chain connecting said wheels, the said oppositely-extending arms being on the same side of the frame, substantially as described.

3. In a bicycle, a frame having two bars or rods extending from the steering-head to the rear wheel, a box or hanger supported from the said bars or rods, a cross-bar connecting said bars in rear of the hanger or box; and a saddle-post rod having its lower end extending through the cross-bar and carried forward between the said bars and connected to the said box or hanger, substantially as described.

In witness whereof I have hereunto set my hand in presence of two witnesses.

HERCULES CAVICCHI.

Witnesses:
ALONZO F. JUDD,
ARTHUR E. LAMARCHE.